(No Model.)
R. W. & W. HUBBARD.
VEHICLE AXLE.
No. 287,438. Patented Oct. 30, 1883.
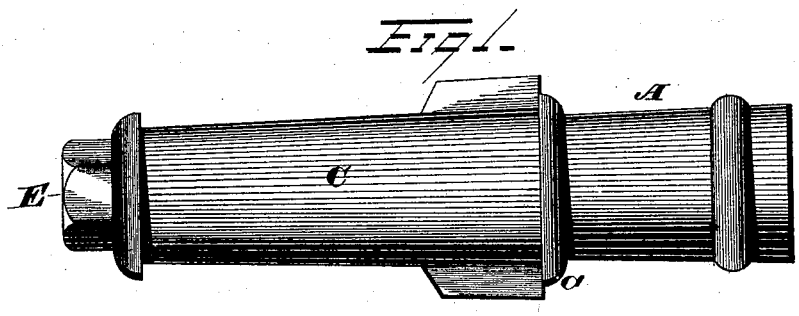
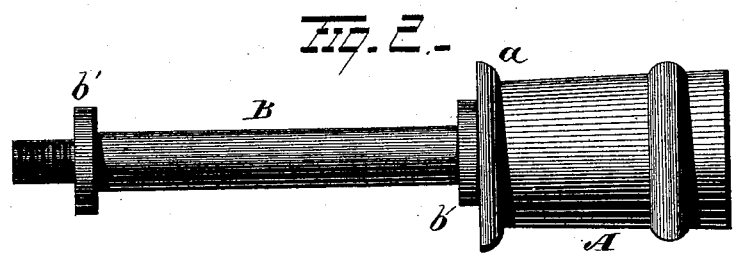
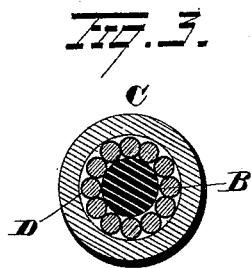
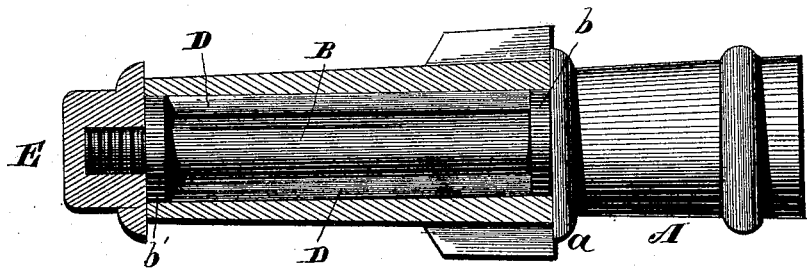
WITNESSES
INVENTOR
R W Hubbard
W Hubbard.
Attorney

UNITED STATES PATENT OFFICE.

RICHARD W. HUBBARD AND WILLIAM HUBBARD, OF ASHTABULA, OHIO.

VEHICLE-AXLE.

SPECIFICATION forming part of Letters Patent No. 287,438, dated October 30, 1883.

Application filed June 1, 1883. (No model.)

*To all whom it may concern:*

Be it known that we, RICHARD W. HUBBARD and WILLIAM HUBBARD, of Ashtabula, in the county of Ashtabula and State of Ohio, have invented certain new and useful Improvements in Vehicle-Axles; and we do hereby declare the following to be a full, clear, and exact description of the invention, such as will enable others skilled in the art to which it appertains to make and use the same.

Our invention relates to an improvement in vehicle-axles, and is designed more particularly as an improvement on Patent No. 268,236, granted us November 28, 1882; and it consists of the parts and combination of parts, as will be more fully described, and pointed out in the claim.

In the accompanying drawings, Figure 1 is a view in side elevation of our improvement. Fig. 2 is a detached view of the spindle. Fig. 3 is a transverse sectional view taken through the sleeve, anti-friction rollers, and spindle; and Fig. 4 is a longitudinal sectional view of Fig. 1.

A represents the axle, the opposite ends of which terminate in cylindrical spindles B. The spindles B are separated from the axle A by the shoulder $a$. The spindle B is provided at its inner end and near its outer end with the rigid collars or shoulders $b\ b'$, which form end abutments or bearings for the anti-friction rods or rollers D. These rods snugly rest on the spindle B, between the collars or shoulders $b\ b'$, and form a bearing for the axle-box C, which turns thereon. The axle-box is sufficiently large to embrace the series of rods D when the latter are placed around the spindle B, and its opposite ends abut, respectively, against the shoulder $a$ and the nut E, as shown.

This device is simple in construction, is durable and efficient in use, and can be manufactured at a small initial cost.

It is evident that slight changes in the construction and relative arrangement of the sever parts of our improvement might be resorted to without departing from the spirit of our invention; and hence we would have it understood that we not confine ourselves to the exact construction shown and described, but consider ourselves at liberty to make such changes and alterations as fairly fall within the spirit and scope of our invention.

Having fully described our invention, what we claim as new, and desire to secure by Letters Patent, is—

The combination, with an axle-spindle having rigid shoulders or collars $a\ b\ b'$, of the anti-friction rollers arranged with their opposite ends abutting against the inner ends of shoulders $b\ b'$, the axle-box C, and nut E, substantially as set forth.

In testimony whereof we have signed this specification in the presence of two subscribing witnesses.

RICHARD W. HUBBARD.
WILLIAM HUBBARD.

Witnesses:
CHAS. T. FIELD,
ALBERT SHERMAN.